(12) United States Patent
Vanstone et al.

(10) Patent No.: US 6,195,433 B1
(45) Date of Patent: Feb. 27, 2001

(54) PRIVATE KEY VALIDITY AND VALIDATION

(75) Inventors: Scott A. Vanstone, Waterloo (CA); Donald B. Johnson, Manassas, VA (US)

(73) Assignee: Certicom Corp., Ontario (CA)

( * ) Notice: Subject to any disclaimer, the term of this patent is extended or adjusted under 35 U.S.C. 154(b) by 0 days.

(21) Appl. No.: 09/074,540

(22) Filed: May 8, 1998

(51) Int. Cl.[7] .............................. H04L 9/30; H04L 9/22
(52) U.S. Cl. ...................... 380/285; 380/30; 380/46; 713/176
(58) Field of Search ................. 380/2, 28, 30, 380/46, 285; 708/250, 255; 713/176

(56) References Cited

U.S. PATENT DOCUMENTS

| | | | |
|---|---|---|---|
| 5,016,274 | 5/1991 | Micali et al. | 380/23 |
| 5,161,244 | * 11/1992 | Maurer | 380/43 |
| 5,299,262 | 3/1994 | Brickell et al. | 380/28 |
| 5,347,581 | 9/1994 | Naccache et al. | 380/30 |
| 5,442,707 | 8/1995 | Miyaji et al. | 380/30 |
| 5,475,763 | 12/1995 | Kaufman et al. | 380/30 |
| 5,625,695 | 4/1997 | M'Raihi et al. | 380/28 |

OTHER PUBLICATIONS

"Applied Cryptography", second edition, Bruce Schneier, John Wiley & Sons, Inc., U.S.A., pp. 169–187, p. 173.
"Cipher Systems", Henry Beker & Fred Piper, Northwood Books, London, pp. 170–174.
"A Universal Statistical Test for Random Bit Generators", U.M. Maurer, Journal of Cryptology, vol. 5, No. 2, 1992, pp. 89–105, pp. 91–92.
PCT International Search Report mailed Aug. 25, 1999 (2 pages).

* cited by examiner

Primary Examiner—Tod R. Swann
Assistant Examiner—Justin T. Darrow
(74) Attorney, Agent, or Firm—Finnegan, Henderson, Farabow, Garrett & Dunner, L.L.P.

(57) ABSTRACT

A method of generating a private key for use in a public key data communication system implemented between a pair of correspondents is disclosed. The method comprises the steps of generating a random number for use as a private key and testing the number against a predetermined set of criteria The criteria are chosen to determine the statistical randomness of the number. The random number is utilized as a key upon satisfying the criteria.

10 Claims, 2 Drawing Sheets

PRIVATE KEY VALIDITY AND VALIDATION

The present invention relates to secure digital data communication stems and, in particular, to a method for ensuring a particular random cryptographic private key value has adequate randomness properties (considered by itself) and a method for validating cryptographic private keys in such systems.

BACKGROUND OF THE INVENTION

Secure data communication systems are used to transfer information between a pair of correspondents. At least part of the information that is exchanged is encoded (enciphered) by a predetermined mathematical operation by the sender. The recipient may then perform a complimentary mathematical operation to unencode (decipher) the information. The enciphering and deciphering of information is normally performed utilizing a cryptographic key determined by the particular graphic scheme implemented between the correspondents. Consequently, there are certain parameters that must be known beforehand between the correspondents. For example, in public key or symmetric key systems, various schemes and protocols have been devised to validate the sender's public key, the identity of the sender and such like.

In all of these schemes, it is assumed that the cryptographic keys, be it the private key, the public key or the symmetric key, is derived and valid as specified in the protocol scheme. Problems, however, will arise if these parameters are either bogus or defective in some way.

Digital signature methods have been derived to prove to a id part that a message was signed by the actual originator. Practical public key signature schemes are based on the difficulty of solving certain mathematical problems to make alteration or forgery by unauthorized parties difficult. Most of the proposed schemes have been based either on the problem of factoring large integers or in the difficulty of computing discrete logarithms over finite fields (or over finite grog in general). For example, the RSA system depends on the difficulty of factoring large integers.

A digital signature of a message is a number which is dependent on some secret known only to the signor, and additionally, on the content of the message being signed. Signatures must be verifiable. If a dispute arises as to whether a party signed (caused by either a signor trying to repudiate a signature it did ate or a fraudulent claimant), an unbiased third party should be able to resolve the matter equitably without requiring access to the signor's secret information, i.e., private key.

The ElGamal signature scheme is a randomized signatures mechanism. In order to generate keys for the ElGamal signature scheme, each entity creates a public key and corresponding private key. Thus, each entity generates a large random prime p and a generator $\alpha$ of the multiplicative group $Z^*_p$. Next, the entities select a random integer a such that $1 \leq \alpha \leq p-2$ and computes the value $y = \alpha^3 \bmod p$. Thus, for example, entity A's public key is (y) along with the system parameters p and $\alpha$, while A's private key is $\alpha$.

The security of the above system is generally based on the difficulty of the discrete log problem. The RSA cryptosystem uses a modulus of the form $n = pq$ where p and q are distinct odd primes. The primes p and q must be of sufficient size that factorization of the product is beyond computational reach. Moreover, there should be random primes in the sense that they are chosen as a function of a random input through a process defining a pool of candidates of sufficient cardinality that an exhaustive attack is infeasible. In practice, the resulting primes must also be of a predetermined bit length to meet systems specifications. Without these constraints on the selection of the primes p and q, the RSA system is vulnerable to a so-called "first person attack".

In elliptic curve cryptosystems, the elliptic curve private key is a statistically unique and unpredictable value selected between 1 and n–1 where n is the prime order of G, the generating point of the large subgroup specified by the associated EC domain parameters.

In a possible "first person attack", entity A the attacker, creates a private key that is weak and uses it to obtain services and such like. Later, the dishonest entity repudiates or disavows its private key as being weak and then claims that it did not request these services. That is, party A alleges it inadvertently used a weak private key resulting in a public key that was easily attacked, allowing a third party to derive its private key and thus, was able to impersonate the original entity A For example, where the key is generated using a seeded hash to produce a 161 bit private EC key by generating $2^{64}$, party A may select the one (expected) key with a high order 64 bits of 0s. The first party goes to a judge with a repudiation request and points out that an adversary could attack remaining 97 bits in feasible time. He therefore repudiates his key as it has already been shown that 97 bit keys can be broken. Clearly, in high security applications, it is desirable to avoid the fit person attack.

One way to address this possible concern about first party repudiation is simply to deny all fat party repudiation requests. However, this may result in a problem if a key is generated that actually is weak. What is needed is the ability of the owner to be assured that his particular private key is not weak. In some applications it may not be sufficient to claim that generation of weak key pairs is statistically improbable. The owner wants to be assured that his specific key has no properties that might make it weak, as no matter what value it might be, he is not able to later repudiate it.

The cryptographic strength of the key depends to a large extent on the random distribution of bits in the binary representation used as the key. Thus, although the key may be generated by a pseudorandom number generator and is therefore random, it may be weak if the digits are distributed in a recognizable pattern or grouped to provide a shorter key.

Thus, it is desirable to implement an ECC ElGamal type scheme in which the probability of private key repudiation is minimized.

SUMMARY OF THE INVENTION

In general terms, the present invention provides a method of generating a private key for use in a public key data communication system implemented between a pair of correspondents, said method comprising the steps of generating a random number for use as a private key, testing said number against a predetermined set of criteria to determine the statistical randomness of said numbers and utilizing said random number upon satisfying said criteria.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
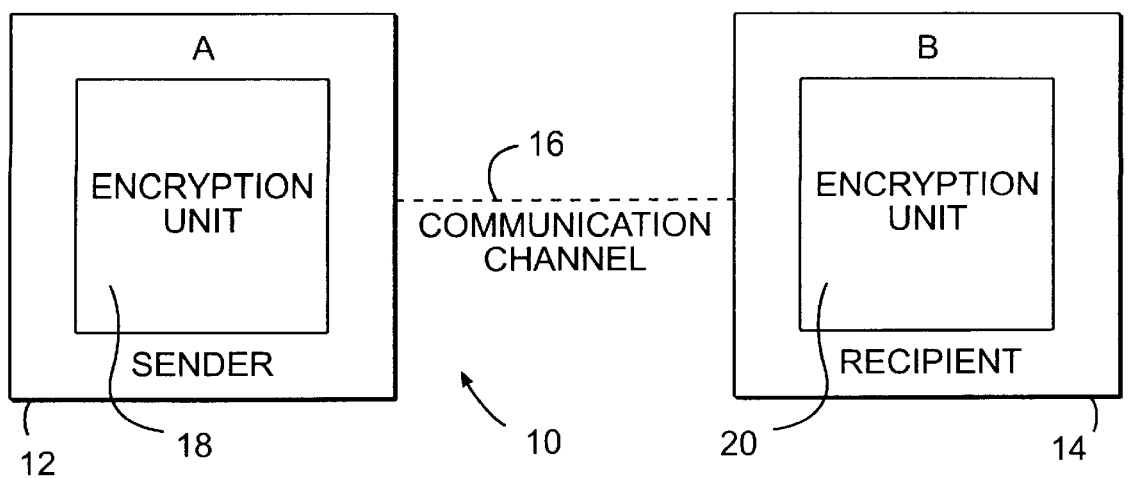
FIG. 1 is a schematic diagram of a digital communication system.

Referring to FIG. 1, a digital data communication system 10 includes a pair of correspondents designated as a sender 12 and recipient 14 who are connected by a communication channel 16 Each of the correspondents 12 and 14 includes an encryption unit 18, 20, respectively that may p( digital information and prepare it for transmission through the channel 16 as will be described below.

In the following description, embodiments of the invention will be exemplified with reference to an elliptic curve ElGamal type scheme understood that the other cryptosystems or Diffie Hellman key exchanges may equally be utilized.

Figure 2:
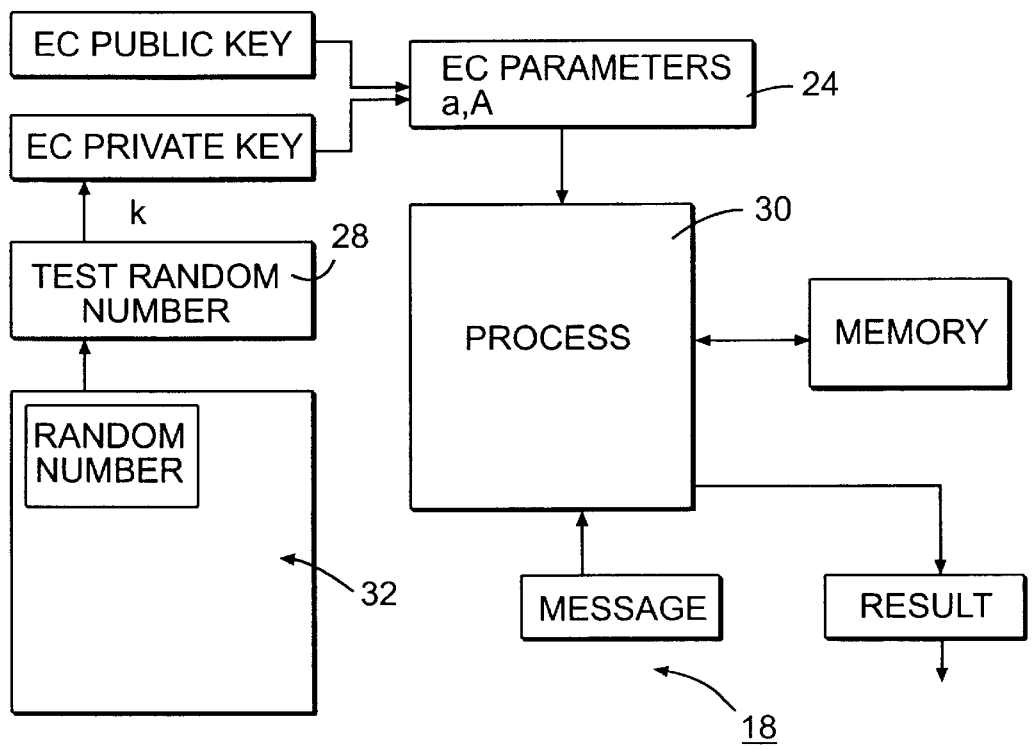
FIG. 2 is a schematic diagram of an encryption unit of FIG. 1.
Figure 3:
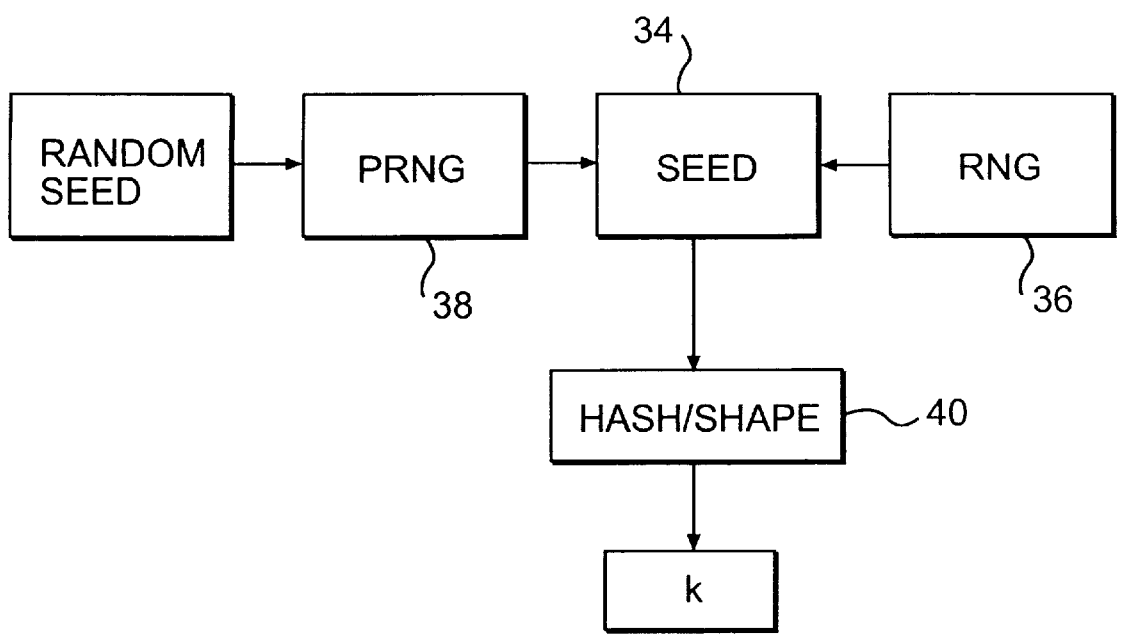
FIG. 3 shows a flow diagram of a canonical private key generation scheme.

An elliptic curve private key is a statistically unique and unpredictable value selected between 1 and n−1, where n is the prime order of G, the generating point of the large subgroup specified by the associated elliptic curve (EC) domain parameters. In high security applications, one may wish to be able to be assured and subsequently demonstrate that strict key generation criteria was met. To facilitate this, a key test processor 28 is included in the key generation an to validate the keys subsequently an EC private key validate processor 30 is incorporated into the encryption units 18, 20:

As shown in FIG. 2, a private key k is generated in a canonical private key generation function 32 as shown in FIG. 2. The random numbers presented as possible private keys from function 32 are selected to be of a size which is approximately the same size as n, the prime order of the generating point G. The numbers can be generated by either a true noise hardware randomizer or via a seeded pseudo-random function as shown in FIG. 3.

Either a (true) random number generator (RNG) 36 or a pseudo random number generator (PRNG) 38 produces a SEED 34. To utilize the PRNG 38 a random seed is input into the PRNG to generate the SEED 34 at the output whereas the RNG generate the SEED 34 directly. The SEED 34 is hashed in a one way function at 40 and the output from the hash is shaped so that it is the correct size for a private key. The resulting value is a bit string that may be used as the private key, denoted as k.

The hash function used is SHA-1. A counter value X'01', X'02', etc. is concatenated to the SEED to produce different 160 bit values, which are concatenated on the night until the resulting value is larger than n. The shape function used is modulo n.

Key test processor 28 receives the value generated by the key generation function 32 and applies to it a predetermined, selectable set of tests that confirm that the key k meets the set of criteria considered acceptable to the user. Typically, the processor may apply standard statistical tests to ensure that the bit distribution in the key appears random and unpredictable. Among the tests that can be used to check for apparent randomness are:
1. Frequency test (monobit test)
2. Poker test
3. Runs test
4. Long run test The output from the generator function 32 is subjected to each of the following tests and if any of the tests fail, then the candidate private key k is rejected. By way of example, The Monobit Test require the counting of the number of ones in the 20,000 bit stream. Denote this quantity by X. The test is passed if 65<X<135 for an error probability of 1 in 1,000,000, i.e., a very high confidence level.

Similarly, the Poker Test divides the 200 bit stream into 66 contiguous 3 bit segments. Count and store the number of occurrences of each of the 8 possible 3 bit values is counted and store Denote f(i) as the number of each 3 bit value i where 0<=i<=8.

Evaluate the following:

$$X = (8/66) * \text{SUM from } i=0 \text{ to } 8 \ [(f(i))**2] - 66$$

The test is considered passed if the value A of x falls within the predetermined range determined by the required confidence level.

The Runs Test utilizes a run defined as a maximal sequence of consecutive bits of either all ones or all zeros, which is part of the 200 bit sample strewn. The incidences of runs (for both consecutive zeros and consecutive ones) of all lengths (>=1) in the sample stream are counted and stored. The distribution of the lengths is monitored by the frequency of the run length in each range compared with an acceptable criteria determined by the required confidence level.

In addition, a long run test may be included the Long Run Test defined to be a run of length 16 or more (of either zeros or ones). On the sample of 200 bits, the test is passed if there are NO long runs.

By including a long run test to the above, one can be assured that any specific private key appears random and is therefore difficult to attack.

By selecting an appropriate value for each statistical test that is related to the confidence level desired by the user for a particular claimed random sequence to be used for a private key, the only keys selected will be those that are acceptable to the criteria set by the user. Thereafter, repudiation is not possible, provided the criteria are met. If the confidence level is zero, then no statistical tests are run. If the confidence level is 80% or 90%, then the appropriate acceptable range of values is determined for each test and the tests run to see if the actual value is in the acceptable range. Note that as the statistic approaches 100%, more candidate private key values will be discarded and therefore key pair generation would be expected to take longer.

Naturally, additional tests may be substituted or included as considered appropriate.

Referring again to FIG. 2, after the key k has been accepted, it is associated within encryption unit 18 with a set of EC domain parameters 24. The domain parameters include a EC public key kG derived from the key k. The parameters also include plaintext (opened) EC private key data structure that is claimed to be associated with the above set of EC domain parameters and EC public key. The plaintext EC private key data structure contains (at least) the following information:
1. An indication of the EC domain parameters associated with this private key.
2. The SEED that produced the value of the private key k.
3. The value of the private key k.
4. An indication of the level of confidence that the value of the private key k "appears" random. This is a value between 0 and 99 applied during the statistical tests and represents a percentage.

The output of this process is either pass or fail. Pass indicates the EC Private Key passed all validation tests. Fail indicates the EC Private Key k did not pass all validation tests. The private and public keys may then be used to sign a message or authenticate a key using established protocols between the correspondents 12, 14.

The EC private key data structure is maintained secure in the domain and opened by implementation dependent means so that the plaintext of the private key is recovered and its integrity verified as part of the process of opening the key.

If a signature is repudiated, the validity of the key may be verified using the private key data structure 24. The parameters are forwarded to a processor 30, which tests the validity of the private key against a predetermined set of criteria.

The process performed in the processor 30 is described as follows:

1. Compare the (claimed) EC domain parameters with the indication in the private key data structure of the associated EC domain parameters to ensure that all respective components are identical in value.
2. Validate the length of the SEED to ensure it is larger than n, the prime order of the generating point G.
3. Validate the SEED by passing it as input to the canonical seeded hash function to ensure that the private key k is the result.
4. Validate the private key k by comparing kG with the value of the (claimed) associated public key to ensure they are identical in value.
5. Validate the value of the private key k to ensure it meets the level of confidence specified in the statistical tests run by the test function 28.
6. If all tests succeed, then output "pass"; otherwise output "fail". A pass indicates that the private key met all criteria specified by the correspondent 12 and therefore, cannot be repudiated.

Applications with very high security requirements may also wish to validate that the per-message secret k value was generated by use of an approved pseudorandom number generator from a KSEED value. When this option is desired, a particular KSEED value is associated with a particular private key and the KSEED value shall not be used for any other purpose. The KSEED value shall be stored securely with the other components of the private key along with an indication regarding which pseudorandom number generator is used The range of possible values for k is the same as the range of possible values for a private key associated with a particular set of domain parameters. The only difference is that multiple k values are generated from KSEED, while one private key is generated from SEED. Knowing this information, the validation routine outputs a caller-specified number of k values and the associated r values (which would normally be a part of the digital signature). The caller then compares the output r values with a stored list of r values from previous signatures, to ensure that they are consistent While the invention has been described in connection with the specific embodiment thereof, and in a specific use, various modifications thereof will occur to those skilled in the an without departing from the spirit of the invention as set forth in the appended claims.

The terms and expressions which have been employed in this specification are used as terms of description and not of limitations, there is no intention in the use of such terms and expressions to exclude any equivalence of the features shown and described or portions thereof, but it is recognized that various modifications are possible within the scope of the claims to the invention.

The embodiments of the invention in which an exclusive property or privilege is claimed are defined as follows:

1. A method of generating a private key and corresponding public key for use by a correspondent as a key pair in a public key data communication system implemented between a pair of correspondents, said method comprising the steps of generating a number to be used as a private key, establishing a predetermined set of criteria to be satisfied by said key, testing said number against each of said set of criteria to determine the suitability of said number as a key, rejecting said number upon failure to meet said criteria, accepting said number as a private key upon meeting said criteria, retaining said private key and said set of criteria against which said key has been tested for subsequent validation, and generating from said private key a corresponding public key, whereby, upon utilization of said key pair in said data communication system, repudiation of said key is inhibited by determining the validity thereof against said set of criteria.

2. A method according to claim 1 wherein said set of criteria include results of statistical tests to determine the randomness of said number.

3. A method according to claim 2 wherein said criteria includes a determination of a confidence level of said statistical tests.

4. A method according to claim 1 where in said set of criteria a selectable set being retained by said one correspondent.

5. A method according to claim 1 wherein said number is produced defined mathematical operation upon by a said method including the step of retaining said seed, said number and said set of criteria in a secure domain.

6. A method of validating a private key used to produce a digital signature in a public key data communication system comprising the steps of one correspondent selecting a number as a private key, testing said number against a set of criteria to determine its suitability as a private key, accepting said number upon satisfying said tests, generating a corresponding public key Thorn said private key, retaining said private key and said criteria in a secure domain, signing a message with said private key to produce a digital signature, verifying the validity of said signature by retrieving said private key from said secure domain, testing said retrieved private key against said set of criteria and validating said signature upon said retrieved private key satisfying said tests, whereby repudiation of said signature is inhibited.

7. A method according to claim 6 wherein said set of criteria include results of statistical tests.

8. A method according to claim 7 wherein said set of criteria is selectable by said one correspondent.

9. A method according to claim 7 in which said retrieved private key is used to generate a corresponding public key and said public keys are compared.

10. A method according to claim 9 wherein said number is obtained by performing a mathematical operation on a seed, said seed, said method including retaining said seed, performing said mathematical operation on said seed and comparing the result with said retrieved private key.

\* \* \* \* \*

UNITED STATES PATENT AND TRADEMARK OFFICE
CERTIFICATE OF CORRECTION

PATENT NO. : 6,195,433 B1
DATED : February 27, 2001
INVENTOR(S) : Scott A. Vanstone et al.

It is certified that error appears in the above-identified patent and that said Letters Patent is hereby corrected as shown below:

Column 1,
Line 38, delete "grog" and insert -- group --;
Line 46, delete "ate" and insert -- create --;

Column 2,
Line 27, delete "fit" and insert -- first --;
Line 29, delete "fat" and insert -- first --;

Column 3,
Line 67, delete "20,000" and insert -- 200 --;

Column 6, claim 6,
Line 40, "Thorn" should read -- from --;

Signed and Sealed this

Nineteenth Day of February, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 6,195,433 B1 Page 1 of 1
APPLICATION NO. : 09/074540
DATED : February 27, 2001
INVENTOR(S) : Vanstone et al.

It is certified that error appears in the above-identified patent and that said Letters Patent is hereby corrected as shown below:

Claim 4, column 6, line 26 "where in" should read --wherein--; and line 27, after "criteria" insert --is--.

Claim 5, column 6, line 30, after "produced" insert --by a-- and after "upon" delete "by a".

Claim 10, column 6, line 56, after "seed," delete "said seed,".

Signed and Sealed this

Twenty-fifth Day of July, 2006

JON W. DUDAS
*Director of the United States Patent and Trademark Office*